Feb. 24, 1970   M. J. McINTYRE   3,497,092
PRE-LOAD TRANSPORT SYSTEM
Filed Sept. 22, 1967   3 Sheets-Sheet 1
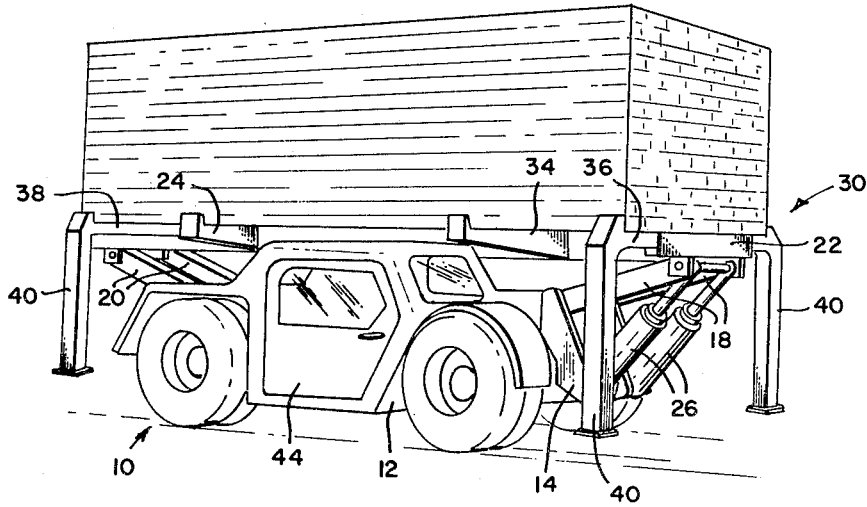
FIG__1
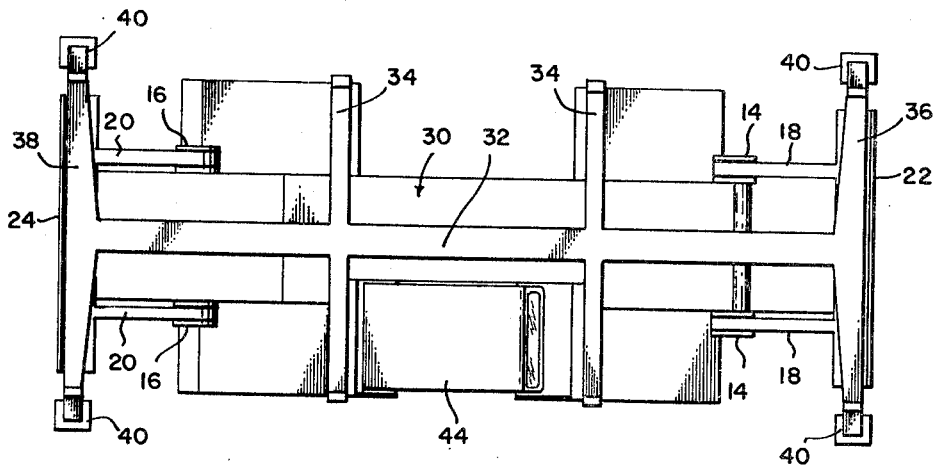
FIG__2
INVENTOR.
MAURICE J. MCINTYRE
BY
Seed, Berry & Davey
ATTORNEYS

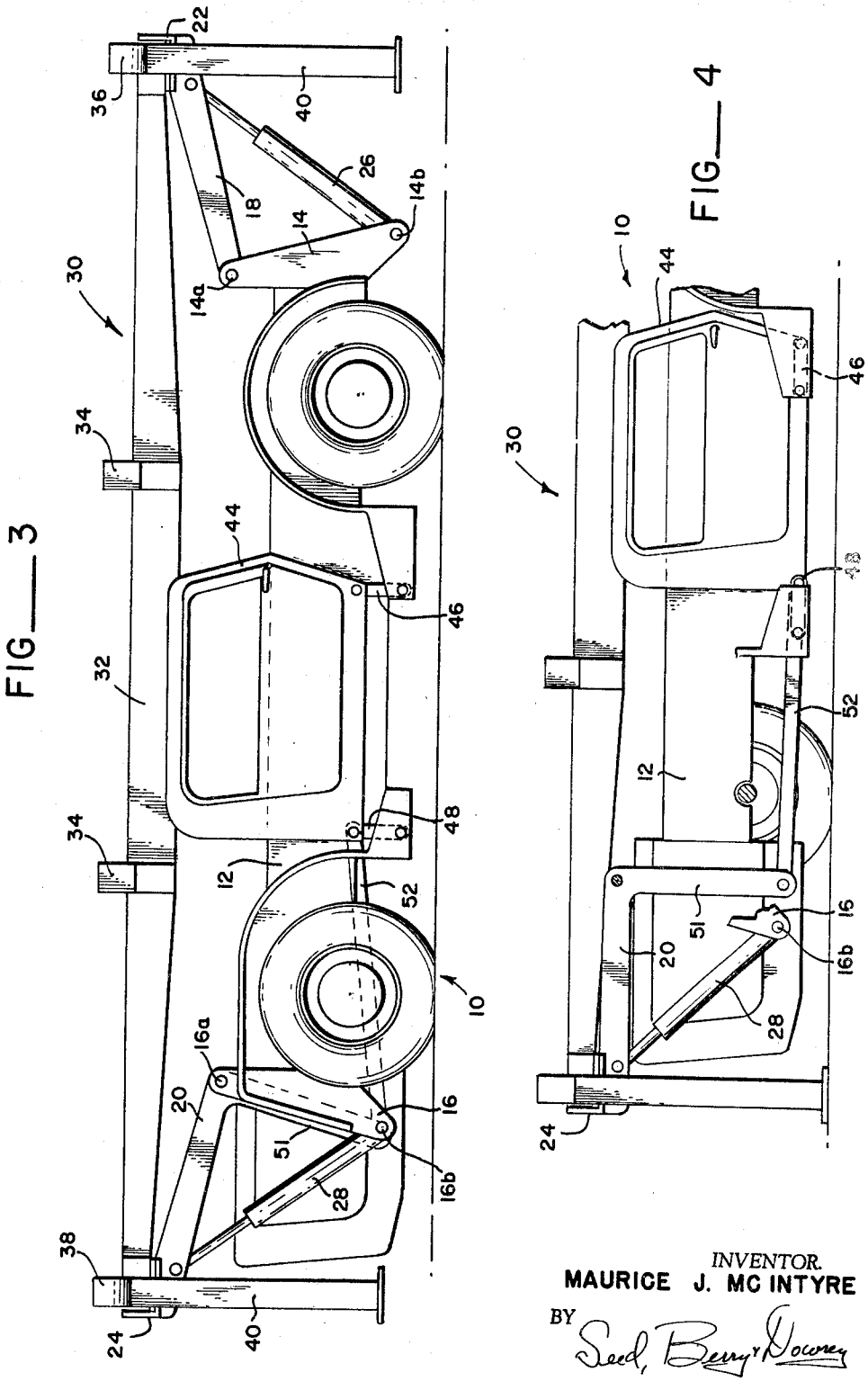

Feb. 24, 1970      M. J. McINTYRE      3,497,092
PRE-LOAD TRANSPORT SYSTEM
Filed Sept. 22, 1967      3 Sheets-Sheet 3
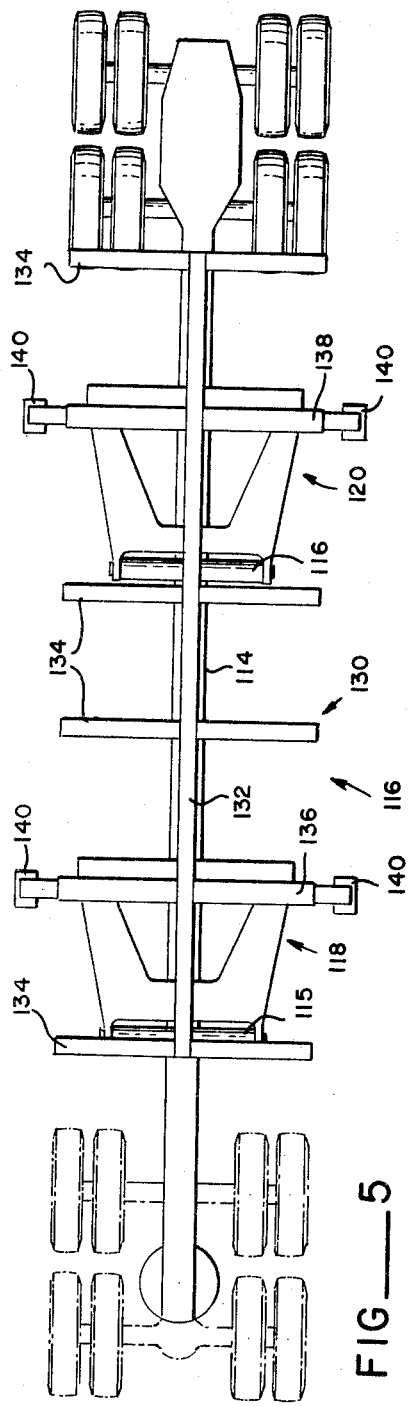
FIG__5
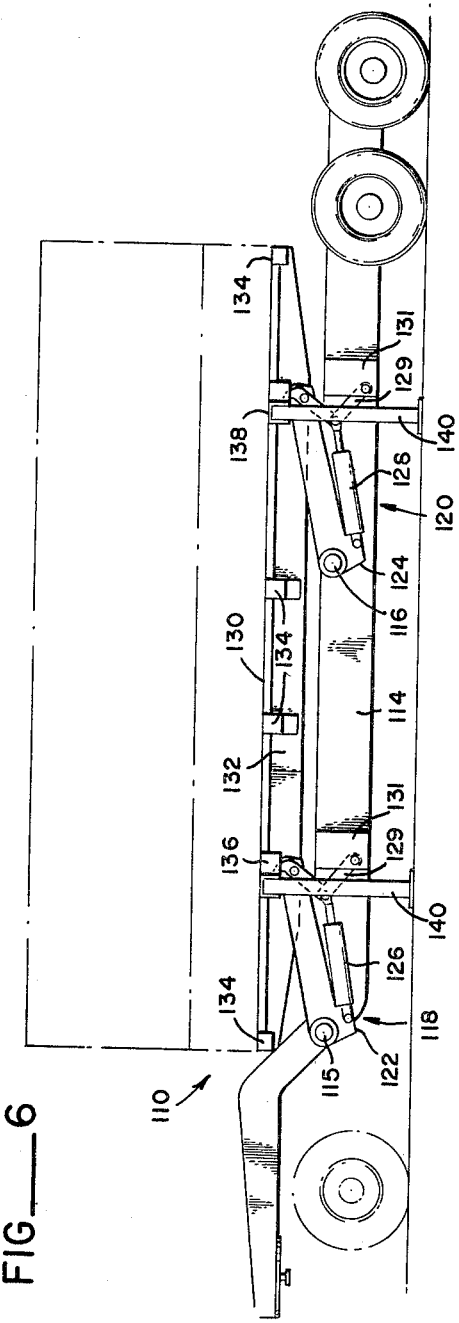
FIG__6
INVENTOR.
MAURICE J. MC INTYRE
BY
ATTORNEYS

United States Patent Office 3,497,092
Patented Feb. 24, 1970

3,497,092
PRE-LOAD TRANSPORT SYSTEM
Maurice J. McIntyre, Sedro Woolley, Wash., assignor to Skagit Corporation, Sedro Woolley, Wash., a corporation of Washington
Filed Sept. 22, 1967, Ser. No. 669,735
Int. Cl. B60p *1/02, 1/64*
U.S. Cl. 214—512                5 Claims

ABSTRACT OF THE DISCLOSURE

Lumber or other material is pre-loaded onto a "high draft" carrier frame, and a load carrying vehicle is driven underneath the carrier frame and lifts it clear of the ground for transport. The vehicle may be self-propelled or drawn by a separate powered vehicle.

---

This invention is a system for transporting pre-loaded material from point to point. More particularly, this invention is a system for transporting material loaded on a "high draft" carrier by driving a load-carrying vehicle underneath the bed of the carrier, raising the carrier clear of the ground or other base upon which it is setting, transporting the loaded carrier to the destination, and lowering the carrier and driving the vehicle from beneath the bed of the carrier.

A system commonly in use to transport large loads of material, such as lumber, is to assemble the material on a pallet or screeds, drive a high draft-high center of gravity vehicle over the load, and then grasp the load and raise it from its base for transport. The size and cost of these vehicles becomes substantial when built for handling large heavy loads. Furthermore as these vehicles become larger their stability, when not carrying a load decreases substantially. This stability problem becomes a substantial hindrance to efficient operation if loads are to be transported over relatively long distances of a mile or more because empty vehicles must return to their loading point at a safe, stable low speed. Considering the problem of transporting lumber from a mill or dockside for ocean shipment, it is not unusual for a load of lumber to be transported several miles from the mill to an intermediate warehousing point to clear the mill yard. The lumber is then transported several miles from the warehousing point to dockside, as required, for loading on board a cargo ship. The first transport leg from the mill yard to the warehousing point is usually run by lumber trucks carrying large loads at highway speeds. Thus, the load must be loaded onto the truck at the mill by lift trucks and unloaded at the warehousing point by other lift trucks, the entire lumber truck returning empty. The second transport leg is then run by the aforementioned high draft-high center of gravity vehicles at relatively low speeds, their return unloaded being made at even lower speeds.

This procedure involves an expensive duplication of equipment: two fleets of lift vehicles; and lumber trucks and high draft carrier vehicles. Furthermore, this procedure involves a substantial amount of vehicle "lost time": time spent loading and unloading the lumber trucks; and time spent returning unloaded high draft vehicles at low speeds to the warehousing point.

A primary object of this invention is to provide a pre-load transport system wherein high capital expenditure caused by equipment duplication can be minimized and wherein time wasted in loading and unloading, and in low speed transport in unloaded condition can be minimized. These and other objects and advantages will become apparent from the following description in conjunction with the accompanying drawings, of which:

FIG. 1 is a perspective of a self-propelled load carrier system according to this invention;
FIG. 2 is a top plan view of the FIG. 1 system without a load;
FIG. 3 is a side view of the FIG. 1 system;
FIG. 4 is a detail side view of the FIG. 1 system;
FIG. 5 is a top plan view of a trailer-type load carrier system according to this invention; and
FIG. 6 is a side view of the FIG. 5 system.

The system of this invention comprises a load carrying vehicle having a wheeled frame adapted to be positioned beneath a pre-assembled load and to raise the load overhead for transport. This vehicle may have its own power plant or it may be a trailer driven by another self-powered vehicle. Lift means are connected to the forward and rearward sections of the vehicle frame and adapted to lift the forward and rearward end sections of the overhead load for transport. Means are also provided to position the raised load against any substantial forward or rearward movement relative to the vehicle. The lift means preferably comprise arms pivotally connected to the wheeled frame such that they can be raised and lowered by hydraulic cylinders and cylinder rod assemblies pivotally connected to the wheeled frame and to the other end sections of the arms.

The system of this invention also comprises a load carrying bed supported on forward and rearward sets of legs. The legs of each set are spaced sufficiently far apart and are of sufficient height that the load carrying vehicle can be driven between them. The forward and rearward vehicle lift means are adapted to lift the forward and rearward end sections of the load carrying bed for transport. The load carrying bed preferably comprises an elongated center beam and at least forward and rearward cross beams connected to and extending transversely of the center beam.

The system of this invention employing a self-powered load carrying vehicle is illustrated in FIGS. 1–4. The vehicle 10 depicted comprises a four-wheeled frame 12 driven from a rear mounted engine-torque converter-transmission drive assembly. Forward and rearward mounting assemblies are attached to the forward and rearward end sections, respectively, of the frame 12. Each such assembly comprises left and right hand sets of brackets, 14—14 and 16—16 respectively, rigidly attached to the respective end sections of the frame 12 and provided with upper horizontal pivot points, 14*a* and 16*a*, respectively, and lower horizontal pivot points, 14*b* and 16*b* respectively.

Forward and rearward pairs of left and right hand load lifting arms 18—18 and 20—20, respectively, are pivotally connected to the respective mounting brackets at the upper pivot points. The arms of each pair are interconnected at their outer free ends by a transversely-extending load engaging and positioning member, 22 and 24 respectively, fabricated in the form of an L-shaped bar with an upright load-positioning leg extending upward from the outermost sections of the arm pairs.

Forward and rearward pairs of left and right hand hydraulic cylinder and cylinder rod assemblies 26—26 and 28—28, respectively, are provided to pivotally raise and lower the load lifting arms. The cylinder ends are pivotally connected to the respective mounting brackets at the lower pivot points. The rod ends are pivotally connected to the outer end sections of the respective load lifting arms. The stroke of these assemblies is sufficient to raise the load lifting arms into engagement with the overhead load and to lift it free of the ground, and to lower the load lifting arms so that the load engaging and positioning members 22–24 will clear an overhead load when the vehicle is driven into or out of its load lifting position.

The load carrying bed 30 comprises a horizontal, longitudinal center beam 32, two intermediate horizontal cross beams 34—34 connected to and extending at right angles to the center beam, and forward and rearward horizontal cross beams 36–38 connected to and extending at right angles to the center beam. The upper sides of the center and cross beams define a load-supporting plane. The outer ends of the cross beams are extended upward above the load-supporting plane and serve as load retainers. The outer ends of the forward and rearward cross beams are also extended downward to provide the four legs 40 of the bed.

The horizontal legs of the load engaging and positioning members 22–24 are sufficiently wide to remain in sliding contact with the underside of the forward and rearward cross beams 36–38 as the load lifting arms are pivoted to raise and lower the bed 30. When the bed is in its fully raised condition, minimal gap will exist between the outer sides of the forward and rearward cross beams and the adjacent surfaces of the upstanding legs of the respective cross bars 22–24 as depicted in FIGS. 2 and 3. Consequently, the raised bed will be restrained against any substantial movement relative to the vehicle.

The vehicle operating cab 44 is offset from the longitudinal center line of the vehicle such that it will be positioned between the bed intermediate cross beams and to one side of the bed center beam when the vehicle is positioned for lifting the bed. The cab is shown pivotally mounted to the vehicle frame 12 by forward and rearward links 46–48. One of the forward or rearward load lifting arms is provided as a bell crank with a depending leg 51. An intermediate link 52 is pivotally connected at one end to the lower end of the leg 51 and at the end of the cab. These linkages are so constructed and assembled that the cab will remain stationary in the lowered position depicted in FIG. 4 as the load lifting arms are swung into and out of engagement with the bed, and such that the cab will be raised and lowered as the load lifting arms raise and lower the bed. Thus, as the bed is raised, the cab will be raised to provide the operator with a better view of the roadway. The direct mechanical linkage described above ensures that a premature lowering of the bed will not result in damage to the cab since the two are lowered simultaneously.

FIGS. 5 and 6 depict a preferred trailer-type load carrying vehicle 110. This vehicle comprises a frame provided in the form of an elongated center transfer beam mounted on a rear wheel assembly and having a forward gooseneck draft bar for connecting with a self-propelled vehicle. Forward and rearward mounting assemblies are provided on the frame in the form of horizontal cross shafts 115 and 116, respectively. Forward and rearward load lifting arm assemblies 118 and 120, respectively, are pivotally journaled to opposite ends of the respective cross shafts. Each load lifting arm assembly is fabricated so as to provide two load lifting arms and a transversely-extending load engaging and positioning member that interconnects the outer free ends of the arms. In vertical elevation, each assembly, 118–120, appears similar to a pair of bell cranks with the load lifting arms being major left and right hand links extending upwardly from the horizontal pivot and with right and left hand minor links 119–120 extending downwardly and rearwardly from the horizontal pivot.

Forward and rearward pairs of left and right hand hydraulic cylinders and cylinder rod assemblies 126–128, respectively, are provided to pivotally raise and lower the load lifting arms, one such assembly being positioned beneath each load lifting arm. The cylinder ends are pivotally connected to respective left and right minor links of the respective forward and rearward load lifting arm assemblies. The rod ends are pivotally connected to the midpoint of respective left and right hand overcenter toggle linkages 129. The toggle linkage lower ends are pivotally conected to respective left and right hand block members 131 transversely extending out from the frame 114, and the toggle linkage upper ends are pivotally connected to the free ends of the respective left and right hand load lifting arms. The rod stroke, together with the effect of the toggle linkage and bell crank, is sufficient to raise the load lifting arms into engagement with an overhead load and to lift it free of the ground, and to lower the load lifting arms so that the load engaging and positioning members will clear an overhead load when the vehicle is driven into and out of its load lifting position.

The load carrying bed 130 comprises a horizontal, longitudinal center beam 132, two intermediate and two end horizontal cross beams 134—134 connected to and extending at right angles to the center beam, and forward and rearward horizontal cross beams 136–138 connected to and extending at right angles to the center beam. The upper sides of the center and cross beams define a load-supporting plane. The outer ends of the forward and rearward cross beams are extended downward to provide the four legs 140 of the bed.

The upper surface of the lifting arm load engaging and positioning members are sufficiently wide to remain in sliding contact with the underside of the forward and rearward cross beams 136–138 as the load lifting arms are pivoted to raise and lower the bed 130. The upper end of each toggle linkage is provided as an arcuate hook that is pivotally inserted into a respective slot in the underside of the forward and rearward cross beams 136–138 when the load engaging and positioning members are raised to contact the forward and rearward cross beams. These toggle hooks serve to restrain the bed against any substantial movement relative to the vehicle.

It is believed that the invention will have been clearly understood from the foregoing detailed description of my now-preferred illustrated embodiment. Changes in the details of construction may be resorted to without departing from the spirit of the invention.

The embodiments of the invention in which an exclusive property or privilege is claimed are defined as follows:

1. A load carrier system which comprises a load carrying vehicle having a wheeled frame adapted to be positioned beneath a pre-assembled overhead load; first lift means connected to the forward end section of said vehicle and adapted to lift the forward end section of the overhead load and second lift means connected to the rearward end section of said vehicle and adapted to lift the rearward end section of said overhead load; said first and second lift means each comprising a pair of load lifting arms pivotally connected to said frame and adapted to be pivotally swung upward into engagement with the overhead load, hydraulic means adapted to pivotally extend and retract said load lifting arms, and first and second pairs of toggle linkages, each linkage having a lower end section pivotally connected to said frame, an upper end section pivotally connected to an outer arm end, and an intermediate section pivotally connected to said hydraulic means; the upper ends of the said toggle linkages being hook shaped and adapted to be pivotally engaged with the overhead load to position such load when contacted and raised by pivotal extension of said load lifting arms.

2. A load carrier system which comprises a load carrying bed supported on forward and rearward sets of legs, the legs of each set being spaced sufficiently far apart and being of sufficient height for a load carrying vehicle to be driven between them, said bed comprising an elongated center beam and at least forward and rearward cross beams connected to and extending transversely of said center beam; and a self-powered load carrying vehicle having a wheeled frame adapted to be positioned below said bed with an overall length less than the overall length of said bed, first lift means connected to and extending outwardly from the forward end section of said frame and adapted to lift the forward end section of said bed substantially vertically upward, second lift means connected to and extending outwardly from the rearward end section of said frame and adapted to lift the rearward end section of said bed substantially vertically upward, and an operator's cab mounted by said frame and positioned relative thereto to underlay said bed between overhead cross beams when said lift means are engaged with said bed.

3. The load carrier of claim 2 wherein said first and second lift means each comprise a pair of load lifting arms pivotally connected to said frame and adapted to be pivotally swung upward to lift said bed, first and second load engaging members interconnecting the outer ends of the respective load lifting arms of each pair and adapted to engage the forward and rearward cross beams of said bed.

4. The load carrier of claim 3 wherein each load engaging member comprises an L-shaped bar with an upright load positioning leg extending upward from the outermost sections of the arm pairs.

5. A load carrier system which comprises a load carrying bed supported on forward and rearward sets of legs, the legs of each set being spaced sufficiently far apart and being of sufficient height for a load carrying vehicle to be driven between them, said bed comprising an elongated center beam and at least forward and rearward cross beams connected to and extending transversely of said center beam; and a load carrying vehicle having a wheeled frame adapted to be positioned below said bed, first lift means connected to the forward end section of said frame and adapted to lift the forward end section of said bed, and second lift means connected to the rearward end section of said frame and adapted to lift the rearward end section of said bed; said first and second lift means each comprising a pair of load lifting arms pivotally connected to said frame and adapted to be pivotally swung upward to lift said bed, first and second load engaging members interconnecting the outer ends of the respective load lifting arms of each pair and adapted to engage the forward and rearward cross beams of said bed, and first and second pairs of toggle linkages, each linkage having a lower end section pivotally connected to said frame, an upper end section pivotally connected to an outer arm end, and an intermediate section pivotally connected to said hydraulic means, the upper ends of said toggle linkages being hook shaped and adapted to be pivotally inserted into respective slots in the forward and rearward cross beams of said bed.

References Cited
UNITED STATES PATENTS

| | | |
|---|---|---|
| 804,975 | 11/1905 | Porter. |
| 1,608,039 | 11/1926 | Romine. |
| 2,379,094 | 6/1945 | Maxon. |
| 3,184,082 | 5/1965 | Hall _____ 214—77 |
| 3,341,042 | 9/1967 | Carder _____ 214—512 |
| 3,362,552 | 1/1968 | Thiele _____ 214—515 XR |

ROBERT G. SHERIDAN, Primary Examiner

U.S. Cl. X.R.

214—515